July 10, 1962

J. DECKER ETAL 3,043,056

MACHINE TOOL CONSTRUCTION TO ELIMINATE
EFFECT OF EXPANSION IN MEMBERS

Filed May 18, 1959

INVENTORS
JACOB DECKER
ALBERT D.C. STUCKEY
BY Howard T. Keiser
& John F. Verhoeven

ATTORNEYS

INVENTORS
JACOB DECKER
ALBERT D. C. STUCKEY
BY Howard T. Keiser
& John F. Verhoeven
ATTORNEYS

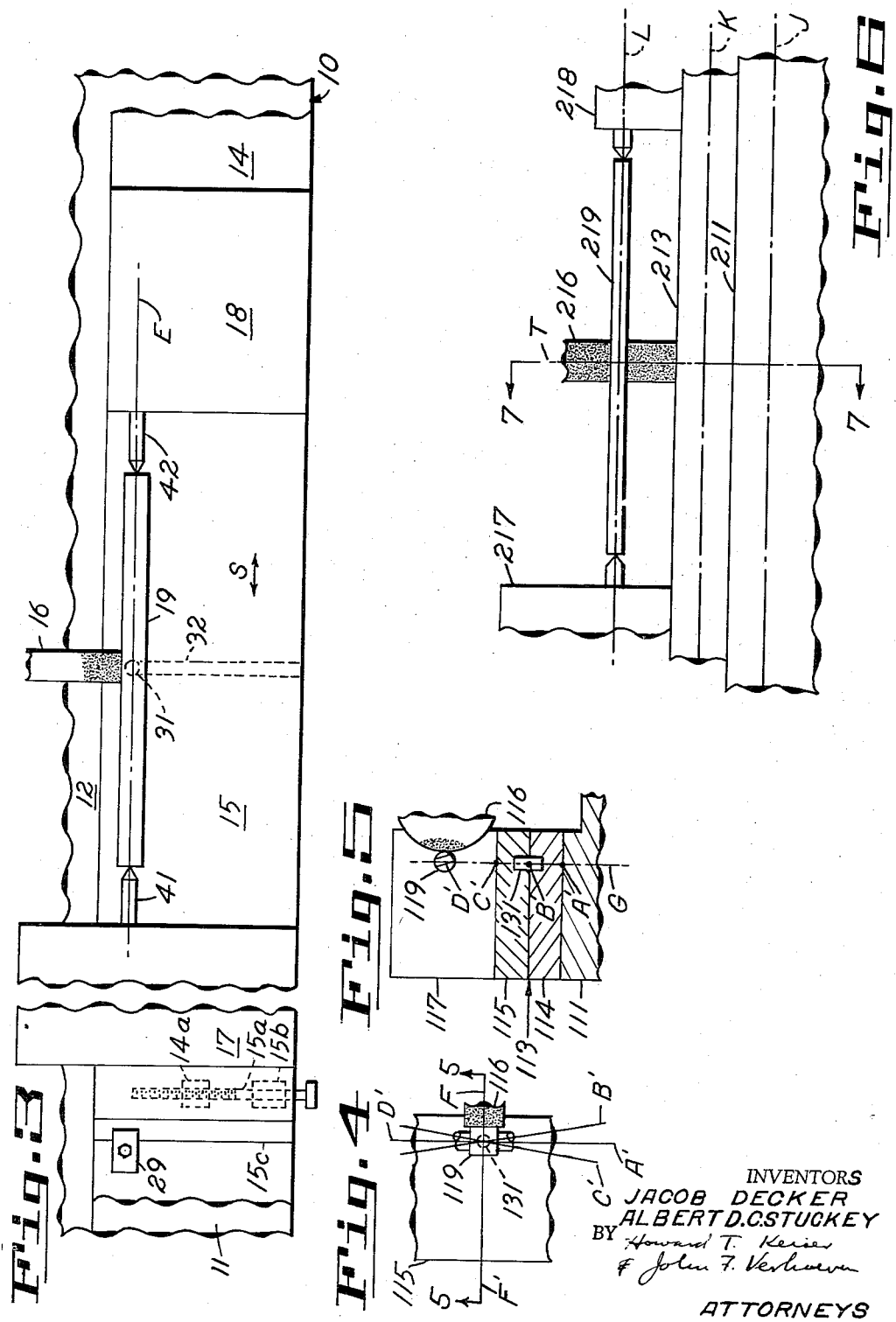

United States Patent Office 3,043,056
Patented July 10, 1962

3,043,056
MACHINE TOOL CONSTRUCTION TO ELIMINATE EFFECT OF EXPANSION IN MEMBERS
Jacob Decker and Albert D. C. Stuckey, Cincinnati, Ohio, assignors to The Cincinnati Milling Machine Co., Cincinnati, Ohio, a corporation of Ohio
Filed May 18, 1959, Ser. No. 813,732
23 Claims. (Cl. 51—50)

The present invention relates to a machine tool construction to minimize the effect of temperature fluctuations on the accuracy of the forming operation by a novel arrangement of the machine tool members.

The present invention is described herein as embodied in a center-type grinding machine in which a workpiece is mounted between a headstock and a tailstock for rotation about a longitudinal axis, and in which a grinding wheel, mounted in a wheelhead for rotation about an axis parallel to the axis of the workpiece, is moved laterally into the workpiece which may be reciprocated longitudinally across the peripheral face of the grinding wheel. The lateral cross movement of the grinding wheel into the workpiece is terminated at a predetermined position by a positive stop to form a workpiece of a size determined by the final position of the grinding wheel relative to the axis of the workpiece. Alternately, the workpiece may be rotated in a fixed position as the grinding wheel is fed laterally into the workpiece for plunge cut grinding.

Heat generated during the forming operation will produce temperature fluctuations in various members of the machine tool and cause corresponding expansion of the members. For example, friction from rotating gears and shafts in the headstock and wheelhead will produce a temperature rise in these members. The temperature of the table member which supports the headstock will be significantly affected by the coolant poured on the workpiece and falling on the table. On the other hand, the base of the machine, being of substantial mass and without high speed rotating parts, will have relatively small temperature fluctuations compared to the above mentioned members. Thus, normally, the various members of the machine tool can be expected to expand in varying amounts during the forming operation. This can seriously affect the accuracy of the forming operation. If, for example, the workpiece, because of expansion of its mounting members, is displaced away from the final position of the grinding wheel, an oversize workpiece will be produced. Or, if one end of the workpiece is displaced a greater amount from the final position of the grinding wheel than the other end, because of greater expansion in the headstock than the tailstock, an undesired taper will be produced.

It is therefore a general object of the present invention to minimize the effect of temperature fluctuations on the accuracy of the forming operation.

It is an important object of the present invention to confine the displacement of a point or line, such as the workpiece axis, from a predetermined position, because of temperature fluctuation, to movement within a single predetermined plane passing through the base and fixed relative thereto so that regardless of the amount of expansion or contraction of each of the various members supporting the workpiece on the base, there will be no component of movement or displacement of the workpiece axis normal to this plane, which is referred to herein as the plane of displacement. The elimination of the displacement of the workpiece axis in a direction normal to this predetermined plane of displacement is accomplished by the novel arrangement of the connecting means of the workpiece supporting members relative to the axis of the workpiece. The member mounted on the base (the table member) is in guiding or locating engagement with the base along a single longitudinal locating line defined by a slide on the table member engaged with a guiding way on the base so that lateral expansion of the member relative to the base will occur about that line. A second member (such as the headstock or tailstock) is mounted on the first member for locating or guiding engagement therewith along a single longitudinal locating line defined by the engagement of the members so that any lateral expansion of the second member relative to the first member will occur about that line. These two locating lines define the displacement plane and the headstock and tailstock support the workpiece on an axis in this plane. Since the supporting members are fixed to the base, and one to the other, in this plane no point or line in this plane (such as the axis of the workpiece) will be displaced out of this plane although displacement can and will occur within the plane. Since this displacement plane passes through a portion of the base, movement of the workpiece axis in one direction relative to the base because of expansion or contraction of the supporting members has been eliminated in the present invention.

While it is important when the workpiece is reciprocated longitudinally past the grinding wheel for the operation thereon that any displacement of the workpiece occur only in the displacement plane defined by the longitudinally extending locating lines, when the workpiece is rotated in one position at the grinding wheel for a plunge cut operation it is the displacement of the workpiece axis in the plane of the cutting tool which is important. It is therefore another object of the present invention to limit the displacement of the workpiece axis, in the plane of the cutting tool, due to expansion in the mounting members, to a straight displacement line defined by the points where the longitudinally extending locating lines intersect the plane of the cutting tool.

Another object of the present invention is to locate the final position of the grinding wheel relative to the base in the direction of the radial line of the grinding wheel which passes through the workpiece axis so that minimum displacement of this final position relative to the base and relative to the axis of the workpiece will occur because of expansion or contraction of the locating and mounting members. This is accomplished by providing a power actuated shaft parallel to said radial line and having a forward end with a terminal surface toward the workpiece. The wheelhead is engaged with the forward end of the shaft, for cross movement when the shaft is actuated, and the forward terminal surface of the shaft contacts a locating surface in the base to terminate cross movement at a predetermined final position of the wheelhead. Since the wheelhead is engaged with the forward end of the shaft, and the base locating surface engages the forward terminal surface of the shaft, there is a minimum amount of metal in the direction parallel to the radial line passing through the workpiece between the axis of the grinding wheel and the base locating surface. It is only the expansion of a relatively short span of the shaft and the forward portion of the wheelhead which can affect the final position of the wheelhead relative to the base, and, when expansion occurs in both the wheelhead and the shaft, the effect of expansion in one member will tend to offset the expansion in the other member so the net effect of the expansion will be minimal. In this manner the final position of the grinding wheel is fixed relative to the portion of the base having the locating surface against which the shaft abuts.

Another object of the present invention is to orient the the cutting tool relative to the displacement plane (or displacement line) of the workpiece axis so that displacement of the workpiece axis relative to the final position of the grinding wheel as a result of expansion will not occur in the one critical direction which will most seriously affect the accuracy of the forming operation. In some specific operations axial displacement of the workpiece relative to the grinding wheel, or tangential displacement of the workpiece relative to the grinding wheel, may be important, but generally it is displacement of the workpiece relative to the final position of the grinding wheel in the direction parallel to the radial line of the grinding wheel passing through the workpiece which is most critical and which can most seriously affect the accuracy of the forming operation. It is relative displacement in this critical direction which has been minimized in the present invention. This is accomplished by orienting the grinding wheel relative to the plane of displacement (or line of displacement) of the workpiece axis so that the radial line of the grinding wheel passing through the workpiece is normal to that plane (or line). By this particular arrangement displacement of the workpiece axis due to expansion, which can occur only in the plane of displacement because of the specific construction and arrangement of the workpiece mounting members (or along the displacement line in the plane of the grinding wheel), will occur only tangentially and axially relative to the final position of the grinding wheel and no relative displacement between the workpiece and the final position of the grinding wheel can occur in the critical direction along the radial line passing through the workpiece. The shaft member which actuates the wheelhead is aligned parallel to this radial line of the grinding wheel so that displacement of both the axis of the workpiece and the axis of the grinding wheel in its final position in this critical direction is minimized.

Another object of the present invention is to minimize any displacement between the workpiece and the final position of the grinding wheel in the critical direction which might occur because of temperature fluctuation in the base. This is accomplished, in part, by locating the plane, or line, of displacement of the workpiece, passing through one portion of the base, as close as possible to the locating surface against which the wheelhead actuating shaft abuts, which surface is in another portion of the base. In the preferred form of the invention the locating surface in the base is positioned for engagement by the forward terminal surface of the shaft (the end towards the workpiece) and the displacement plane, or line, is located on the rear side of the workpiece mounting members (the side towards the grinding wheel) so that the two locating portions of the base are as closely spaced as possible. In addition to this arrangement, which minimizes the span of metal between these portions and hence the expansion due to temperature rise in the base, a coolant passage through the base between these portions is provided to reduce temperature fluctuations during the forming operation.

Thus in the preferred form of the present invention, the effect of expansion from heat on the displacement of the workpiece in one direction relative to one portion of the base is eliminated, displacement of the final position of the cutting tool in one direction relative to another portion of the base is minimized, the cutting tool is oriented relative to the workpiece so that the direction of minimum displacement of both the workpiece and the cutting tool is in the one direction most critical to accuracy in the forming operation, and the members are positioned so that the two portions of the base relative to which the workpiece and cutting tool are located are closely spaced and no significant expansion or contraction will occur therebetween.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 3 is a fragmentary, somewhat schematic, view taken on the line 3—3 of FIG. 1;

FIG. 4 is a fragmentary schematic top plan view of a machine of the same type as the machine of FIG. 1 but having the locating lines thereof oriented differently;

FIG. 5 is a view taken on the line 5—5 of FIG. 4;

FIG. 6 is a schematic front elevational view of a machine of the type of FIG. 1 with modifications.

Figure 1:
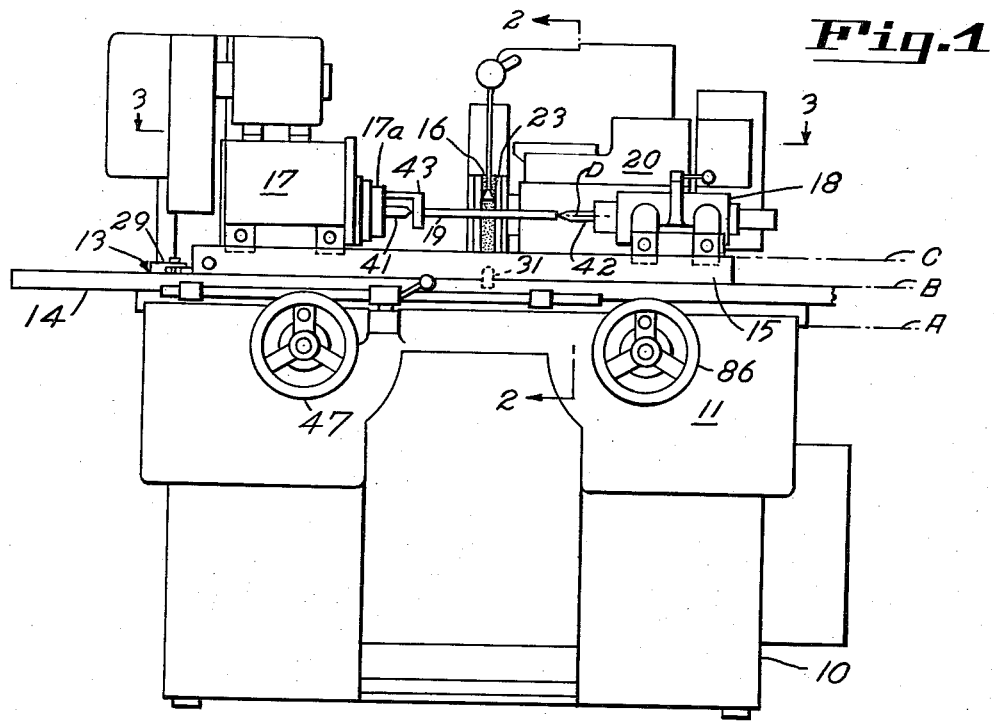
FIG. 1 is a front elevational view of a grinding machine embodying the present invention.
Figure 2:
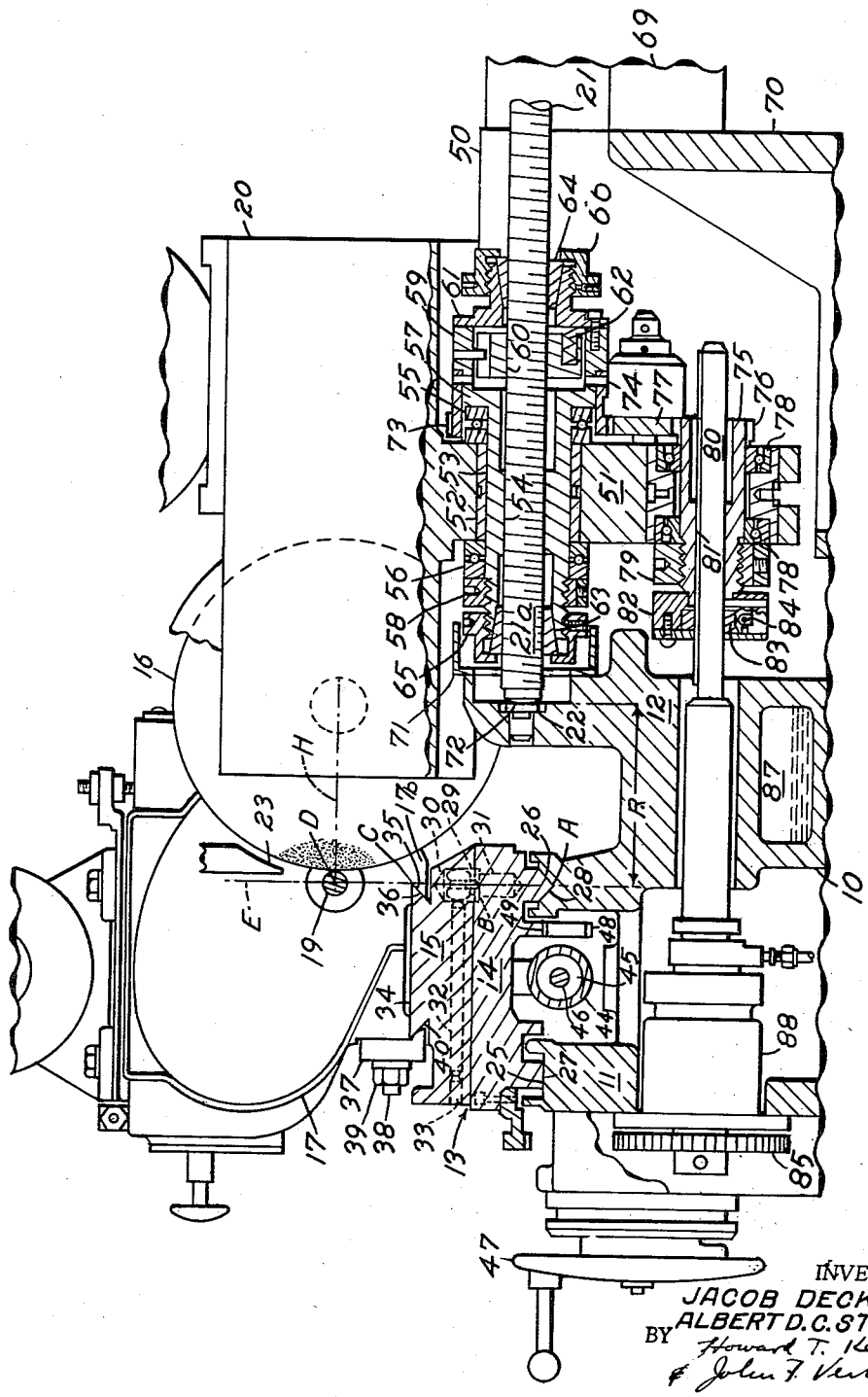
FIG. 2 is a view taken on the line 2—2 of FIG. 1.

As shown in FIGS. 1, 2, and 3, the grinding machine has a base 10 having a forward portion 11 and a rear portion 12. A table member, indicated generally at 13 and consisting of a reciprocating table 14 and swivel table 15, is mounted on the forward portion 11 of the base for longitudinal movement past a grinding wheel 16. Workpiece supporting members consisting of a headstock 17 and tailstock 18 are adjustably clamped in spaced relation on the table member and have means to support a workpiece 19 therebetween. The grinding wheel 16 is rotatably carried in a wheelhead 20 which is movably mounted on the rear portion 12 of the base for cross movement in a lateral direction relative to the workpiece by a power actuated shaft 21. The final forward position of the grinding wheel is determined by engagement of the shaft 21 with stop member 22 mounted in the base. Coolant is discharged through the nozzle 23, connected to the wheelhead, onto the workpiece and grinding wheel.

The forward portion 11 of the base has a flat way 25 and rearwardly thereof a V way 26 on its upper surface, both extending longitudinally (normal to the plane of the paper in FIG. 2), which ways respectively receive a flat slide 27 and a guided V slide 28 of the table member, the latter being located adjacent the rear edge of the table 14. The V way 26 and slide 28, alone, locate the table member in the lateral or cross direction relative to the base and constitute extended and continuous linear locating means at the boundary separating these members about which lateral expansion of the table member relative to the base will occur. More specifically this linear locating means defines a locating line A extending longitudinally in the apex of the V about which line expansion of the table member 14 in the lateral direction occurs and which line remains fixed relative to the base during expansion or contraction of the table member. This line may be outside the table member 14, if, for example, the slide 28 were flat on the bottom and did not extend to the apex of the V way 26.

The swivel table 15 has a recess 30 therein which receives the head of a pivot pin 31 mounted in the reciprocating table 14 adjacent the rear edge thereof. The rod 32, carried in the swivel table 15 and adjusted axially by screw 33, engages the head of pin 31 to eliminate any play in the pivot connection defined by the pin 31. The swivel table may be rotated relative to the reciprocating table 14 about the pivot connection by any suitable means, such as a nut 14a mounted in the reciprocating table 14 longitudinally spaced from the pin, and a screw 15a engaged with the nut and journaled in a bushing 15b mounted in the swivel table 15, the screw and the nut being carried in a recess between the table member 14 and swivel table 15. The swivel table is clamped in a desired position by clamp 29 bolted to the reciprocating table and engaged with a flange 15c on the swivel table. Since there is play in the rotating mechanism it is the clamp 29 and pin 31 which, alone, locate the swivel table 15 relative to the reciprocating table 14. These two locating members lie on a locating line B on the top surface of member 14, which line is parallel to way 26.

The clamp 29 and pin 31 each constitute cross locating means and, although spaced from each other, together constitute linear locating means connecting the swivel table 15 to reciprocating table 14 at the boundary separating these members and lateral expansion or contraction of the swivel table 15 relative to the reciprocating table member 14 occurs about line B.

The swivel table has a male dovetail 34 on the upper surface thereof, the rear edge surface of which defines a locating surface, or shoulder 35 adjacent the rear edge of the swivel table. The headstock 17 has a surface 36 on a rigid depending portion 17b in mating engagement with the shoulder 35 and held thereagainst by clamp 37 secured on headstock stud 38 by nut 39. The clamp is engaged with the forward clamping edge surface 40 of the dovetail and when the clamp is drawn up snug there will be some resiliency in the clamping connection so that when the headstock expands relative to the swivel table 15 the surface 36 of the headstock will still be held firmly against shoulder 35 and the headstock will be located on the swivel table in the lateral, or cross, direction solely by said locating shoulder 35. The surface 36 and shoulder 35 constitute linear locating means, at the boundary separating the swivel table and the headstock, extending normal to the plane of the paper in FIG. 2, about which lateral expansion of the headstock relative to the swivel table occurs. More specifically, this linear locating means defines a longitudinal locating line C, fixed relative to the swivel table 15 and at the upper end of the locating shoulder 35, about which expansion of the headstock relative to the swivel table in the lateral direction occurs.

The tailstock 18 is located on the shoulder 35 of the swivel table 15 and clamped on the swivel table 15 in the same manner as the headstock and will not be described further.

The headstock and tailstock have centers 41 and 42 on axis D which define the axis about which the workpiece 19, supported between the centers, is rotated by dog 43 engaged with the headstock spindle 17a. The movable table member 14, and hence the workpiece 19, may be reciprocated longitudinally past the grinding wheel as shown by arrow S in FIG. 3, by means of a hydraulic cylinder 44 connected to the table. The cylinder has a piston 45 mounted therein, connected to piston rods 46 extending through each end of the cylinder which are connected to the forward portion of the base by conventional means (not shown). Manual movement of the table is accomplished by handwheel 47 which is operatively connected by means (not shown) to gear 48 engaged with rack 49 on the table.

When the swivel table member 15 is rotatably adjusted to grind a cylindrical workpiece the linear locating means connecting the reciprocating table member 14 to the base portion 11 (slide 28 and way 26), the linear locating means connecting the swivel table 15 to the reciprocating table member 14 (pivot pin 31 and clamp 29), the linear locating means connecting the headstock 17 and tailstock 18 to the swivel table 15 (locating shoulder 35 and surface 36), and the axis D of the centers 42 and 43 and of the workpiece 19 all lie in a common plane E passing through the forward portion 11 of the base. This plane defines a plane of displacement in which all displacement of the workpiece axis D relative to the base, due to expansion or contraction of the workpiece mounting members 14, 15, 17, and 18, will occur. This is so since all lateral expansion of a member relative to the member to which it is connected by the linear locating means must occur on either side of the plane. Hence, points or lines on the members in the plane of displacement will not be displaced laterally out of the plane but will only be displaced within the plane. It should be noted that the linear locating means and the axis D need not be parallel in the plane of displacement.

It is important when, for example, a long cylindrical workpiece is reciprocated past the grinding wheel, that the linear locating means by which the workpiece mounting members are connected lie substantially in, or preferably in, a common plane. In other operations, however, such as in plunge cut grinding, it is only the position of the linear locating means at the plane of the cutting tool which is important. If the machine has a unitary table member corresponding to member 13 in FIG. 2 with no swivel table, the linear locating means corresponding to lines A and C, if not in a common plane, must cross at the plane of the grinding wheel. If the table consists of two members including a swivel table pivotally connected at a point to a shiftable table member the linear locating means connecting the headstock to the swivel table and the linear locating means connecting the shiftable table to the base, if not in a common plane with the pivot point, must cross at the pivot point and the table must be shiftable to move the pivot point to the plane of the grinding wheel. This is illustrated in FIGS. 4 and 5 where there is shown schematically a machine similar to the machine of FIG. 2 except for the orientation of the linear locating means, the last two digits of the identifying numerals in FIGS. 4 and 5 being the same as the numerals identifying corresponding members in the machine of FIG. 2. The table 113, comprising table member 114 and swivel table 115, may be held stationary in a predetermined position with the pin 131 opposite the grinding wheel 116 and a workpiece 119, which has a cylindrical portion to be ground of less span than the grinding wheel, may be rotatably mounted above the pin 131 for grinding as the grinding wheel 116 is fed laterally into the workpiece. The lines defined by the linear locating means (A', B', C'), although not lying in a common plane, constitute points in a plane F' passing through the table 113 at pin 131, which points lie on a line G of plane F'. The line G defines a displacement line, in plane F', along which the axis D' of the workpiece (which is mounted above pin 131 in plane F') will move in plane F' when there is expansion or contraction in the workpiece mounting members. This is so because there can be no expansion laterally with respect to the linear locating means in any member relative to the member on which it is mounted. Therefore, in plane F', there can be no lateral expansion out of the line G which connects the linear locating lines in that plane. It will be noted that with this construction, where lines B', C', and D' intersect the plane F' passing through the table members in the straight displacement line G, they will retain this straight line relationship, and the line A' will intersect the plane F' on this line, regardless of the longitudinal position of the table on the base. The table plane F' is parallel to the grinding wheel plane F and, for plunge cut grinding, the table 113 can be positioned with the plane F' aligned with the plane F as shown in FIG. 4 and there will then be no displacement of the workpiece towards or away from the grinding wheel. It will be noted that with this construction the swivel table can be rotated for forming tapered workpieces, the rotation of the swivel table 115 rotating line C' and axis D'. However line C' and axis D' will still intersect the plane F' on the line G, since the pivot point defined by pin 131 is on the line G, and movement of the workpiece axis at the plane F of the grinding wheel, towards or away from the grinding wheel due to expansion in members 114, 115, or 117, is precluded.

Therefore, it will be seen that by this novel arrangement and connection of the members through which the workpiece is mounted on the base, displacement of the axis of the workpiece relative to the base in one direction because of expansion or contraction of these members is eliminated.

As shown in FIGS. 1 and 2, the rear portion 12 of the base has a V way (not shown) and a flat way 50 extending perpendicular to ways 25 and 26 upon which is mounted the tool supporting member, or wheelhead, 20 for movement towards and away from the workpiece 19. The wheelhead 20 has a central portion 51 depending between the ways in which portion is carried a sleeve 52. Rotatably mounted in the sleeve is a nut 53 internally threaded at 54 for engagement with the forward end 21a of lead screw shaft 21. The nut 53 is secured against axial movement relative to wheelhead portion 51 by thrust bearings 55 and 56 mounted on the nut on each side of portion 51, bearing 55 held thereagainst by a flange 57 on the nut and bearing 56 held thereagainst by collar 58 threadedly engaged with the nut. The flange 57 has a rearwardly extending skirt portion 59 inside of which a backlash nut 60 is threadedly received on the screw 21. A terminal plate 61 is connected to the rear surface of the skirt portion 59 of nut 53 and a spring 62, received in the backlash nut, is engaged with the terminal plate to urge the lead screw into firm engagement with the nut 53 at 54 to eliminate backlash therebetween. The lead screw shaft 21 is held in proper centered relation in the nut 53 by sleeves 63 and 64 having an unthreaded cylindrical inner surface and a conical outer surface. The sleeves are wedged between the screw 21 and the nut 53 at the forward end of the nut and between the screw and the terminal plate 61. The sleeves are held in position by caps 65 and 66.

During automatic feed the lead screw is not rotated but, instead, is shifted axially by a power actuating unit connected by bracket 69 to the base member 70 and which may, for example, be similar to the lead screw actuating mechanism shown in U.S. Patent 2,718,101 of Stuckey and Decker issued September 20, 1955. As the screw is shifted forwardly the forward end extends through guard 71 connected to the base and the forward terminal surface 72 of the screw abuts against stop member 22 mounted in the base portion 12 to determine the final position of the grinding wheel. This arrangement minimizes the effect of heat expansion in the direction parallel to the lead screw on the final position of the grinding wheel relative to the base. As the screw 21 heats up during operation it is only the span between the forward terminal surface 72 and the portion of the screw engaged with nut 53 at 54 which can affect the final position of the grinding wheel. It should be noted that expansion of the wheelhead between the axis of the grinding wheel and the depending portion 51 in the direction parallel to the screw 21 will tend to offset the effect of expansion in the forward end of the screw on the final position of the grinding wheel relative to the base.

In order to accommodate workpieces of different sizes the position of the nut 53 on the screw can be manually changed. For this purpose a gear 73 is pinned to the nut 53 at 74. The nut 53 is operatively connected to a sleeve 75 through the gear 73, a gear 76 integral with sleeve 75, and an idler gear 77 therebetween. The idler gear 77 is mounted on a shaft rotatably received in the depending portion 51 of the wheelhead. The sleeve 75 is rotatably mounted in wheelhead portion 51 by bearings 78 and secured therein by collar 79. The shaft 80, received in sleeve 75, is keyed thereto at 81, and a cap 82 is pinned on one end of the sleeve. The cap has a ring 83 therein slotted to receive the key and the ring can be rotated by screw 84 relative to the sleeve to clamp the key in the sleeve and eliminate backlash therebetween. The shaft 80 is journaled in bushing 88 connected to the forward portion 11 of the base and has a gear 85 operatively connected to handwheel 86. It will thus be seen that rotation of handwheel 86 will rotate nut 53 to adjust the position of the nut on the screw 21 so that on power shifting of the screw 21 axially the wheelhead will be stopped in its adjusted position.

In the preferred embodiment of the invention the radial line H of the tool, or grinding wheel 16, which passes through the workpiece axis D is normal to the displacement plane in the machine of FIGS. 1, 2, and 3. Moreover, this particular radial line H is parallel to the shaft 21 and displacement of the grinding wheel relative to the base in the direction of line H has been minimized by the construction described above. Therefore, since displacement of the workpiece axis relative to the base can occur only in the displacement plane, as described above, it is evident that with the present construction relative displacement between the workpiece axis and the grinding wheel in the direction of the radial line of the grinding wheel passing through the workpiece will be minimal. Generally, relative displacement between the workpiece and the cutting tool in this critical radial direction is much more serious to the accuracy of the forming operation than relative displacement in the longitudinal direction or in the tangential direction.

It will be seen that the displacement of the workpiece has been eliminated in the critical radial direction of line H relative to the base portion 11 and the displacement of the grinding wheel has been minimized in the critical radial direction of line H relative to the base portion 12. Although the base, because of its mass, experiences relatively small temperature fluctuations during operation any effect of temperature fluctuation in the base on the accuracy of the forming operation is minimized in the present invention. It will be noted that the span R between the portions of the base relative to which the workpiece and the grinding wheel are located is minimal. The way 26 is located at the rear of the table toward the grinding wheel and the stop member 22 is mounted in the base in front of the screw 21 and toward the workpiece. Moreover a coolant passage 87 is provided through the base between that portion on which way 26 is located and that portion in which stop member 22 is mounted.

Figure 7:
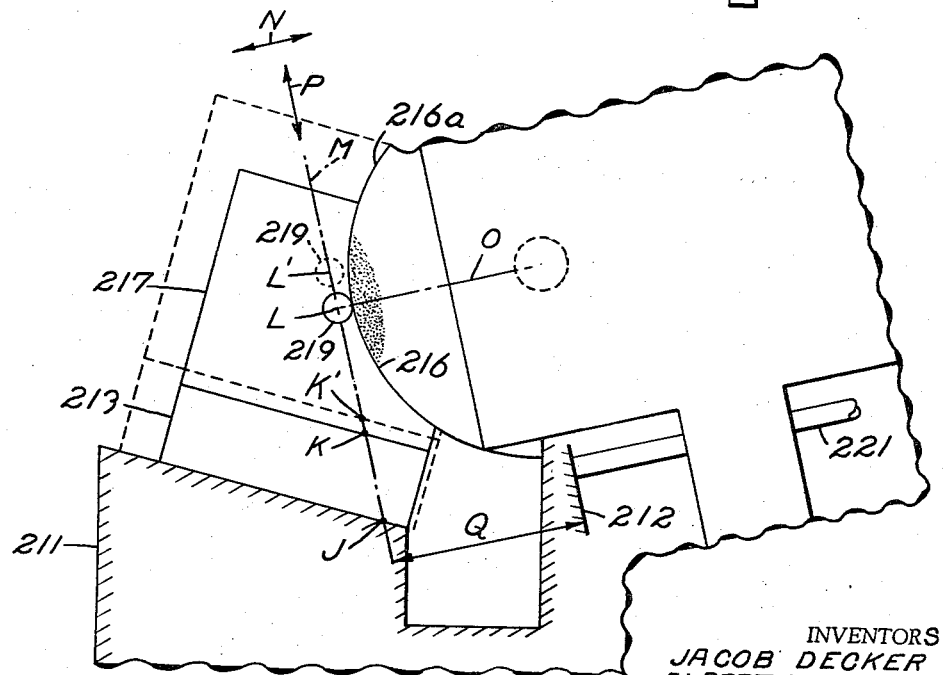
FIG. 7 is a view taken on line 7—7 of FIG. 6.

The operation of the present invention is described more fully in conjunction with the machine of FIGS. 6 and 7. This machine has a unitary table member 213 which may be reciprocated on base portion 211 longitudinally past a grinding wheel 216, or which may be held stationary in a predetermined position to support the workpiece 219 at the grinding wheel. In this embodiment the single linear locating means connecting the table member 213 to the base portion 211 at their boundary to hold the table against lateral movement relative to the base extends along a line J normal to the plane of the paper in FIG. 7. The single linear locating means connecting the headstock 217 and tailstock 218 to locate these members against lateral movement relative to the table 213 extends along a line K at their boundaries parallel to line J, and the centers of the headstock and tailstock lie on a predetermined axis L parallel to lines J and K. These lines all lie in a displacement plane normal to the plane of the paper in FIG. 7, which plane includes the line M, the line M also lying in the plane T of the grinding wheel. Assuming there is expansion of member 213 relative to base 211 the line K will be displaced to K'; and, assuming expansion of member 217 relative to member 213, the axis L will be displaced to L', the amount of the displacements being greatly exaggerated in the drawings for clarity. Thus, the workpiece, although displaced because of expansion in the workpiece supporting members, remains in the plane of displacement. Regardless of the extent of the expansion or contraction in the workpiece supporting members, the workpiece will remain in the plane of displacement defined by the linear locating means and containing the axis of the workpiece.

Considering now only the plane T of the grinding wheel, the linear locating means J and K, and axis L, define points in this plane which lie on the displacement line M of plane T. If the workpiece, during grinding, is held in plane T at the grinding wheel, it is the relative location of these points which is important and if they lie on line M, displacement of the workpiece in plane T can occur only along the line M. Thus it is evident that there is no component of displacement lateral to the displacement plane, or line M, and displacement of the workpiece relative to the base portion 211 in one direction N (that is, normal to the displacement plane or normal to line M in the plane T of the grinding wheel) has been eliminated.

Displacement of the grinding wheel 216 in a direction parallel to the radial line O of the grinding wheel which passes through the predetermined axis L of the workpiece has been minimized relative to base portion 212 by a construction similar to the construction described above in conjunction with FIG. 2.

As in the embodiment of FIG. 2, the cutting tool 216 of the machine has an arcuate periphery, defining arc 216a, in the plane T and the cutting tool has been oriented relative to the plane of displacement (and the line M therein) so that the radial line O of the arc 216a which passes through the predetermined axis L of the workpiece is normal to the displacement plane and displacement line M. With this preferred construction relative displacement in the direction N will be minimal. This is so because displacement of the grinding wheel relative to base portion 212 in the direction of line O, which is parallel to N, has been minimized, and because displacement of the workpiece axis relative to the base portion 211, while it can occur longitudinally, or tangentially (in direction P), can not occur in the N direction. From FIG. 7 it is evident that relative displacement of the workpiece 219 and grinding wheel 216 in the direction N would more seriously affect accuracy of the forming operation than displacement either axially or tangentially.

Also, as in the embodiment of FIG. 2, the distance Q between the location of the displacement plane in base portion 211 and the portion of base portion 212 against which the shaft abuts to locate the final position of the grinding wheel has been minimized.

There has thus been provided a machine tool construction in which relative displacement of the workpiece relative to the final position of cutting tool has been minimized in the direction most critical for the accurate precision forming of workpieces.

What is claimed is:

1. In a machine tool having a forming member and having means to receive a member to be formed thereby, supporting structure to hold one of said members for rotation about an axis in a predetermined forming position in front of the other member, said supporting structure having a plurality of separating boundaries dividing said structure into relatively shiftable contacting elements for positioning of said one member into said predetermined forming position, said elements defining single locating lines therebetween at each of said separating boundaries about which expansion and contraction of each element relative to the element on which it is mounted occurs, said locating lines and said axis intersecting a plane at the other member along a straight line when said elements are positioned to hold said one member in said predetermined forming position.

2. In a machine tool having a workpiece forming tool, supporting structure to hold a workpiece for forming by the forming tool, said supporting structure having a plurality of separating boundaries dividing said structure into elements relatively shiftable into predetermined relationship to position the workpiece in front of the forming tool, said elements engaged at all of said separating boundaries for location therebetween along a single locating line at each separating boundary, said locating lines and said workpiece intersecting a plane through the tool along a straight line in said plane when said elements are in said predetermined relationship.

3. In a grinding machine, a base member, a workpiece supporting member having means to support a workpiece for rotation on an axis, at least one table member interposed between said members for positioning the workpiece supporting member in a predetermined position relative to the base and locate said workpiece in a predetermined position for grinding, said members defining a plurality of separating boundaries through which the positioning of said workpiece supporting member relative to the base is effected, means defining a single locating line at each separating boundary through which positioning of said workpiece supporting member relative to the base is effected to hold each contacting surface at each of said separating boundaries against movement laterally of said line relative to the surface in contact therewith, a grinding wheel mounted on the base for movement into a workpiece in said predetermined position, all of said locating lines and said axis intersecting an imaginary line in front of the grinding wheel when the workpiece supporting member is in said predetermined position whereby said axis is displaced relative to the base member due to expansion or contraction along said line only.

4. The grinding machine of claim 3 in which the radial line of the grinding wheel passing through the workpiece axis is normal to the straight line defined by said points whereby displacement of the workpiece axis in the direction of said radial line due to expansion and contraction is eliminated.

5. In a grinding machine for plunge grind operations, a base member, a workpiece supporting member having an axis and having means to support a workpiece for rotation about said axis, at least one intermediate positioning member, said members mounted in stacked relation and defining a plurality of separating boundaries through which all movement of the workpiece supporting member relative to the base to locate the workpiece in a predetermined grinding position is effected, said members having flat contacting surface portions at their separating boundaries to permit expansion and contraction of a member relative to the member on which it is mounted, the member mounted on the base engaged therewith for location relative thereto on a single line at the separating boundary therebetween whereby expansion and contraction of said member relative to the base occurs about said line, each of the other of said members engaged with the member on which it is mounted for location relative thereto on a single line at the separating boundary therebetween whereby expansion and contraction of the mounted member relative to the member on which it is mounted occurs about said line, a wheelhead mounted on the base having a rotatable grinding wheel carried thereby, said wheelhead movable towards and away from a workpiece in the grinding position, said locating lines and said axis defining points in the plane of the grinding wheel, said points lying in a straight line in said plane substantially normal to the radial line of the grinding wheel passing through the workpiece axis when said stacked members are positioned to locate the workpiece in said predetermined grinding position and the grinding wheel is in abrading contact with the workpiece.

6. In a grinding machine having a movable grinding wheel for plunge grind operations on a workpiece, said grinding machine having means defining a support to hold the workpiece in a predetermined position in front of the grinding wheel for abrading contact by the grinding wheel, said support having a plurality of separating boundaries dividing the support into separable members including a base, a pair of spaced workpiece supporting members adapted to hold a workpiece therebetween for rotation about an axis defined by said workpiece supporting members, and at least one intermediate member between the base and the workpiece supporting members, at least some of said members including the workpiece supporting members releasably clamped to the member on which they are mounted for grinding and all of said intermediate members and the workpiece supporting members relatively movable on the members on which they are mounted for adjusting movement of the workpiece supporting members to position the workpiece in said predetermined position, the support having means at all separating boundaries through which adjusting movement of the workpiece supporting members relative to the base is effected to locate each mounted member relative to the member on which it is mounted along a single line about which all expansion and contraction of the mounted member relative to the mounting member will occur, the axis and the line at each separating boundary intersecting the plane of the grinding wheel and defining a point in said plane, the improvement comprising the location of said locating lines and said axis to intersect the plane of the grinding wheel to define points in that plane lying in a straight line perpendicular to the direction of movement of the grinding wheel and perpendicular to the radial line of the grinding wheel passing through the workpiece axis when the separable members of the support are positioned to hold a workpiece in said predetermined position whereby displacement of the workpiece relative to the base due to expansion of contraction in said support will occur along said straight line and in a tangential direction relative to the grinding wheel.

7. In a machine tool having a cutting tool, a base having an elongated guiding way thereon extending longitudinally past the cutting tool, a shiftable table member mounted on the base, said shiftable table member having an upper surface and a single elongated guided slide, said slide engaged with said guiding way to define a locating line about which all lateral expansion and contraction of the shiftable table member and upper surface thereof relative to the elongated guiding way on the base occurs, a swivel table mounted on the shiftable table member and having an upper surface, said swivel table pivotally connected to the upper surface of the shiftable table at a point about which all lateral expansion and contraction of the swivel table and upper surface thereof relative to the upper surface of the shiftable table member occurs, said swivel table having a locating shoulder on the upper surface thereof, a headstock and a tailstock having surfaces to engage the locating shoulder, the engagement of said headstock and tailstock surfaces with said swivel table shoulder defining a single locating line about which all lateral expansion of the headstock and tailstock relative to the upper surface of the swivel table occurs, the headstock and tailstock having means to support a workpiece therebetween on an axis defined by said headstock and tailstock, said lines and said axis intersecting a lateral plane through said pivot point, said lines and said pivot point defining points in said plane in a straight line intersecting the axis, and means to position the shiftable table with the pivot point and said plane opposite the cutting tool.

8. In a machine tool for plunge grind operations on a workpiece, said machine tool having a base and having a workpiece supporting member to support the workpiece for rotation and define the axis of rotation thereof, said machine tool having a grinding wheel mounted on the base movable thereon towards and away from the workpiece, the combination therewith of supporting structure to mount the workpiece supporting member on the base and define only three separating boundaries between the base and the workpiece supporting member through which all positioning of the workpiece supporting member relative to the grinding wheel is effected to position the workpiece in a predetermined grinding position in front of the grinding wheel for plunge grinding thereby, the supporting structure consisting of a first table member mounted on the base for longitudinal movement past the grinding wheel and movable to a predetermined position in front of the grinding wheel, the base and the first table member having means at their boundary to locate the first table member relative to the base along a single line about which lateral expansion and contraction of the first table member relative to the base will occur, a second table member mounted on the first table member and pivotally connected thereto to locate the second table member relative to the first table member at a point about which lateral expansion and contraction of the second table member relative to the first table member occurs, said locating point located opposite the grinding wheel when the first table member is in said predetermined position, the workpiece supporting member mounted on the second table member and the workpiece supporting member and the second table member having means at their boundary to locate the workpiece supporting member relative to the second table member along a single line about which lateral expansion and contraction of the workpiece supporting member relative to the second table member will occur, said workpiece supporting member positionable on said second table member to support a workpiece in a predetermined plunge grinding position when the first table member is in said predetermined position and said pivot point is opposite the grinding wheel, said axis and said locating lines intersecting a lateral plane passing through said pivot point and defining points in said lateral plane lying in a straight line with said pivot point.

9. A machine tool constructed in accordance with claim 8 in which said lateral plane passing through said pivot point coincides with the plane of the grinding wheel when the first table member is in said predetermined position and the grinding wheel moves in said plane in a direction perpendicular to said straight line, the radial line of the grinding wheel passing through the workpiece axis being perpendicular to said straight line in any position of the grinding wheel.

10. In a grinding machine operable selectively for plunge grind operations and traverse grind operations on a workpiece, said machine tool having a base and having a workpiece supporting member to support the workpiece for rotation about an axis, said machine tool having a grinding wheel mounted on the base and movable thereon along a predetermined path, the combination therewith of supporting structure to mount the workpiece supporting member on the base and to define a plurality of separating boundaries between the base and the workpiece supporting member to permit positioning and operational movement of the workpiece supporting member and the workpiece relative to the base, means at all separating boundaries between the base and said workpiece supporting member to locate each member relative to the member on which it is mounted along a single line about which expansion and contraction of the mounted member relative to the mounting member will occur, the supporting structure consisting of a first table member mounted on the base, the locating line between the base and the first table member extending transversely to the path of the grinding wheel, said first table member movable on the base in the direction of said locating line for traverse grinding and shiftable thereon to a predetermined position in front of the grinding wheel for plunge grinding, a second table member adapted to receive the workpiece supporting member, the locating line between the second table member and the workpiece supporting member parallel to the axis of the workpiece, said second table member pivotally connected to the first table member at a pivot point on the locating line therebetween, said pivot point positioned in front of the grinding wheel when said first table member is in said predetermined position, all of said locating lines and axis intersecting a lateral plane passing through the pivot point and at the grinding wheel when said first table member is in said predetermined position for plunge grinding, said locating lines and axis defining points in said plane lying in a straight line substantially perpendicular to the radial line of the grinding wheel passing through the workpiece axis, said locating lines and axis lying in a common plane substantially perpendicular to the radial line of the grinding wheel passing through the workpiece axis when said second table member is pivoted to a predetermined angular position on the first table member for traverse grinding.

11. In a grinding machine a base having a grinding wheel mounted thereon for rotation in a plane and having a guiding way thereon extending longitudinally past the grinding wheel, said grinding wheel movable towards and away from said guiding way, a shiftable table member having an upper surface integral therewith, said shiftable table member mounted on the base and having a guided slide engaged with said guiding way to define a single locating line between the base and the shiftable table member determining all movement of the shiftable table member and upper surface thereof relative to the base and about which all lateral expansion and contraction of the shiftable table member and upper surface thereof relative to the base occurs, a swivel table having a shoulder integral therewith, a pivot pin connecting the swivel table to the upper surface of the shiftable table member for adjusting pivotal movement of the swivel table and shoulder thereof relative to the upper surface of the shiftable table member, said pin determining all movement of the swivel table and shoulder thereof relative to the upper surface of the shiftable table member, a clamp to secure the swivel table in adjusted position on the shiftable table member, said pivot pin and clamp defining a locating line about which expansion and contraction of the swivel table relative to the upper surface of the shiftable table member occurs, a headstock and a tailstock having surfaces to engage said shoulder, the engagement of said headstock and tailstock surfaces and said swivel table shoulder defining a single locating line determining all movement of the headstock and tailstock relative to said swivel table and about which expansion and contraction of the headstock and tailstock relative to the swivel table occurs, the headstock and tailstock clamped to said swivel table shoulder during grinding and having centers to support a workpiece therebetween for rotation about an axis defined by said centers, said locating lines and said axis intersecting a plane through said pivot point, said lines, said axis, and said pivot point defining points in said plane in a straight line, and means to position the shiftable table member with the plane through the pivot point aligned with the plane of the grinding wheel, said straight line perpendicular to the radial line of the grinding wheel passing through the workpiece axis.

12. In a grinding machine having a grinding wheel, a headstock having means to support a workpiece for rotation about an axis, a base member, a single intermediate shiftable table member mounted on the base member and receiving said headstock to position said workpiece in a predetermined plunge grinding position in front of the grinding wheel, said members defining only two separating boundaries between said headstock and the base member, linear locating means for engagement of contacting surfaces at both separating boundaries between said headstock and the base member, said workpiece axis and both of said linear locating means intersecting an imaginary straight line in front of the grinding wheel when said table member is positioned to hold the workpiece in said predetermined plunge grinding position, whereby displacement of said workpiece relative to the base at the grinding wheel due to expansion or contraction in said members will be substantially along said straight line.

13. In a machine tool having a forming member and having means to receive a member to be formed thereby, supporting structure to hold one of said members for rotation about an axis in a predetermined plane extending past the other member, said supporting structure having a plurality of separating boundaries dividing said structure into relatively shiftable contacting elements for effecting traversing movement of said one member in said predetermined plane; said elements defining single locating lines therebetween at each of said separating boundaries about which expansion and contraction of each element relative to the element on which it is mounted occurs, said locating lines lying in said predetermined plane.

14. In a machine tool having a workpiece forming tool, supporting structure to hold a workpiece in cutting contact with the forming tool for forming thereby, said supporting structure having a plurality of separating boundaries dividing said structure into relatively shiftable elements, said elements engaged at all of said separating boundaries for location therebetween along a single locating line at each separating boundary, all of said locating lines and the workpiece lying in a common plane extending past the forming tool, one of said elements movable on the element on which it is mounted in the direction of the locating line therebetween during forming to traverse the workpiece relative to the forming tool.

15. In a grinding machine, a base member, a workpiece supporting member having means to support a workpiece for rotation on an axis, at least one table member interposed between said members for operating movement of the workpiece supporting member relative to the base to effect traversing movement of said workpiece in a predetermined plane for grinding, said members defining a plurality of separating boundaries through which all positioning and operating movement of said workpiece supporting member relative to the base is effected, means defining a single locating line at each separating boundary through which the positioning and operating movement of said workpiece supporting member relative to the base is effected to hold each contacting surface at each of said separating boundaries against movement laterally of said line relative to the surface in contact therewith, a grinding wheel mounted on the base and movable thereon towards and away from said predetermined plane, all of said locating lines and said axis lying in said plane.

16. The grinding machine of claim 15 in which the radial line of the grinding wheel passing through the workpiece axis is normal to said predetermined plane whereby displacement of the workpiece axis in the direction of said radial line due to expansion and contraction is eliminated.

17. In a grinding machine for traverse grind operations, a base member, a workpiece supporting member having an axis and having means to support a workpiece for rotation about said axis, at least one intermediate positioning member, said members mounted in stacked relation and defining a plurality of separating boundaries through which all movement of the workpiece supporting member including movement during grinding relative to the base is effected, said members having flat contacting surface portions at their separating boundaries to permit expansion and contraction of a member relative to the member on which it is mounted, the member mounted on the base engaged therewith for location relative thereto on a single line at the separating boundary therebetween whereby expansion and contraction of said member relative to the base occurs about said line, said member mounted on the base movable thereon during grinding in the direction of said locating line to effect traversing movement of the workpiece in a predetermined plane containing said locating line and the axis of the workpiece, each of the other of said members engaged with the member on which it is mounted for location relative thereto on a single line at the separating boundary therebetween whereby expansion and contraction of the mounted member relative to the member on which it is mounted occurs about said line, each of said locating lines lying in said predetermined plane, and a wheelhead mounted on the base having a rotatable grinding wheel carried thereby, said wheelhead movable towards and away from said predetermined plane in a direction normal thereto, the radial line of the grinding wheel passing through the workpiece axis normal to said predetermined plane.

18. In a grinding machine for traverse grinding operations, said machine having a movable grinding wheel and having means defining a support for axial movement of the workpiece transversely of the grinding wheel in a predetermined plane in front of the grinding wheel, said plane normal to the radial line of the grinding wheel passing through the workpiece axis, said support having a plurality of separating boundaries dividing the support into separable members including a base, a pair of spaced workpiece supporting members adapted to hold a workpiece therebetween for rotation about an axis defined by said workpiece supporting members, said axis lying in said predetermined plane, and at least one intermediate member between the base and the workpiece supporting members, at least some of said members including the workpiece supporting members releasably clamped to the member on which they are mounted for adjusting movement of the workpiece supporting members and one of said intermediate members movable transversely to the grinding wheel on the member on which it is mounted during grinding for operational movement of the workpiece supporting members to effect traversing movement of the workpiece in said predetermined plane, the support having means at all separating boundaries through which adjusting and operational movement of the workpiece supporting members relative to the base is effected to locate each mounted member relative to the member on which it is mounted along a single line about which all expansion and contraction of the mounted member relative to the mounting member will occur, the improvement comprising the location of said locating lines in said predetermined plane containing the axis of the workpiece whereby displacement of the workpiece relative to the base due to the expansion or contraction in said support will occur in said plane and in a tangential direction relative to the grinding wheel.

19. In a machine tool having a cutting tool, a base having an elongated guiding way thereon extending past the cutting tool, a shiftable table member mounted on the base, said shiftable table member having an upper surface and a single elongated guided slide, said slide engaged with said guiding way to define a locating line about which all lateral expansion and contraction of the shiftable table member and upper surface thereof relative to the elongated guiding way on the base occurs, a swivel table mounted on the shiftable table member and having an upper surface, said swivel table pivotally connected to the upper surface of the shiftable table at a point about which all lateral expansion and contraction of the swivel table and upper surface thereof relative to the upper surface of the shiftable table member occurs, said swivel table having a locating shoulder on the upper surface thereof, a headstock and a tailstock having surfaces to engage the locating shoulder, the engagement of said headstock and tailstock surfaces with said swivel table shoulder defining a single locating line about which all lateral expansion of the headstock and tailstock relative to the upper surface of the swivel table occurs, the headstock and tailstock having means to support a workpiece therebetween on an axis defined by said headstock and tailstock, said lines and said axis lying in a common plane through said pivot point and extending past the cutting tool, and means to move the shiftable table on the base to traverse the workpiece in said plane past the cutting tool.

20. In a machine tool for traverse grind operations on a workpiece, said machine tool having a base and having a workpiece supporting member to support the workpiece for rotation and define the axis of rotation thereof, said machine tool having a grinding wheel mounted on the base movable thereon towards and away from the workpiece, the combination therewith of supporting structure to mount the workpiece supporting member on the base and define only three separating boundaries between the base and the workpiece supporting member through which all positioning of the workpiece supporting member relative to the grinding wheel and all movement of the workpiece supporting member relative to the grinding wheel during grinding is effected for positioning of the workpiece axis in a predetermined plane in front of the grinding wheel and for reciprocation of the workpiece axially in said plane past the grinding wheel in traverse grinding, the supporting structure consisting of a first table member mounted on the base for longitudinal movement past the grinding wheel and having means connected thereto for reciprocation thereof in front of the grinding wheel, the base and the first table member having means at their boundary to locate the first table member relative to the base along a single line lying in said predetermined plane and about which lateral expansion and contraction of the first table member relative to the base occurs, a second table member mounted on the first table member and pivotally connected thereto to locate the second table member relative to the first table member at a point lying in said predetermined plane about which lateral expansion and contraction of the second table member relative to the first table member occurs, the workpiece supporting member mounted on the second table member and the workpiece supporting member and the second table member having means at their boundary to locate the workpiece supporting member relative to the second table member along a single line lying in said predetermined plane when said second table member is in a predetermined angular position and about which lateral expansion and contraction of the workpiece supporting member relative to the second table member occurs.

21. A machine tool constructed in accordance with claim 20 in which the grinding wheel moves in a direction perpendicular to said predetermined plane and the radial line of the grinding wheel passing through the workpiece axis is perpendicular to said predetermined plane in any position of the grinding wheel.

22. In a grinding machine a base having a grinding wheel mounted thereon for rotation in a plane and having a guiding way thereon extending longitudinally past the grinding wheel, said grinding wheel movable towards and away from said guiding way, a shiftable table member having an upper surface integral therewith, said shiftable table member mounted on the base and having a guided slide engaged with said guiding way to define a single locating line between the base and the shiftable table member determining all movement of the shiftable table member and upper surface thereof relative to the base and about which all lateral expansion and contraction of the shiftable table member and upper surface thereof relative to the base occurs, a swivel table having a shoulder integral therewith, a pivot pin connecting the swivel table to the upper surface of the shiftable table member for adjusting pivotal movement of the swivel table and shoulder thereof relative to the upper surface of the shiftable table member, said pin determining all movement of the swivel table and shoulder thereof relative to the upper surface of the shiftable table member, a clamp to secure the swivel table in a predetermined angular position on the shiftable table member, said pivot pin and clamp defining a locating line about which expansion and contraction of the swivel table relative to the upper surface of the shiftable table member occurs, a headstock and a tailstock having surfaces to engage said shoulder, the engagement of said headstock and tailstock surfaces and said swivel table shoulder defining a single locating line determining all movement of the headstock and tailstock relative to said swivel table and about which expansion and contraction of the headstock and tailstock relative to the swivel table occurs, the headstock and tailstock clamped to said swivel table shoulder during grinding and having centers to support a workpiece therebetween for rotation about an axis defined by said centers, said locating lines and said workpieces axis lying in a common plane extending past the grinding wheel when said swivel table is in said predetermined angular position on the shiftable table member, said common plane perpendicular to the radial line of the grinding wheel passing through the workpiece, and means to reciprocate the shiftable table member on the base.

23. In a grinding machine having a grinding wheel, a headstock having means to support a workpiece for rotation about an axis, a base member, a single intermediate movable table member mounted on the base member and receiving said headstock to effect traversing movement of said workpiece in a predetermined plane in front of the grinding wheel, said members defining only two separating boundaries between said headstock and the base member, linear locating means extending in the direction of said traversing movement for engagement of contacting surfaces at both separating boundaries between said headstock and the base member to hold said table member and said headstock against movement laterally of the traversing direction relative to the member on which each is mounted, both of said linear locating means lying in said predetermined plane.

References Cited in the file of this patent
UNITED STATES PATENTS

| | | |
|---|---|---|
| 1,676,643 | Hanson | July 10, 1928 |
| 1,961,849 | Fraser | June 5, 1934 |
| 2,021,535 | Bath | Nov. 19, 1935 |
| 2,087,662 | Bysshe | July 20, 1937 |
| 2,438,835 | Weimar | Mar. 30, 1948 |
| 2,572,529 | Silven | Oct. 23, 1951 |